(12) United States Patent
Sakamoto (10) Patent No.: US 8,896,996 B2
(45) Date of Patent: Nov. 25, 2014

(54) DISPLAY DEVICE

(75) Inventor: Takeshi Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 13/525,669

(22) Filed: Jun. 18, 2012

(65) Prior Publication Data

US 2013/0003283 A1  Jan. 3, 2013

(30) Foreign Application Priority Data

Jun. 28, 2011  (JP) ................................. 2011-143141

(51) Int. Cl.
*G06F 1/16* (2006.01)
*G02F 1/1333* (2006.01)

(52) U.S. Cl.
CPC ...... *G02F 1/133308* (2013.01); *G02F 2201/46* (2013.01); *G02F 2001/133314* (2013.01)
USPC ............ 361/679.24; 361/679.21; 361/679.22; 349/58; 349/60

(58) Field of Classification Search
CPC  G06F 1/1601; G06F 1/1637; G02F 1/133308
USPC .............. 361/679.21–679.3, 679.55–679.59; 345/156, 157, 168, 169, 905; 455/575.1; 349/58–60
See application file for complete search history.

(56) References Cited

U.S. PATENT DOCUMENTS

| | | | |
|---|---|---|---|
| 6,577,288 B1 * | 6/2003 | Min ................................ | 345/87 |
| 6,813,159 B2 * | 11/2004 | Irie et al. ....................... | 361/752 |
| 7,463,314 B2 * | 12/2008 | Lee ................................ | 349/58 |
| 7,728,855 B2 * | 6/2010 | Sakuma .................... | 361/679.26 |
| 7,821,591 B2 * | 10/2010 | Lee ................................ | 349/58 |
| 7,961,458 B2 * | 6/2011 | Yukawa et al. .......... | 361/679.21 |
| 2006/0061945 A1 * | 3/2006 | Kim ............................. | 361/681 |
| 2010/0182531 A1 * | 7/2010 | Teratani ........................ | 349/58 |
| 2010/0220257 A1 | 9/2010 | Sakamoto et al. | |

FOREIGN PATENT DOCUMENTS

| | | |
|---|---|---|
| JP | 2007-042537 A | 2/2007 |
| JP | 2009-042537 A | 2/2009 |
| JP | 2010-197974 A | 9/2010 |

OTHER PUBLICATIONS

European Search Report EP 12172807, dated Oct. 30, 2012.

* cited by examiner

*Primary Examiner* — Nidhi Desai
(74) *Attorney, Agent, or Firm* — Sony Corporation (57) ABSTRACT

A display device includes: a display panel; a rear housing covering a back face of the display panel, and including a plurality of first screw holes at a peripheral portion thereof; a frame including a front portion, a side portion, a rear portion, and a plurality of second screw holes provided in the rear portion, the front portion covering a peripheral portion of a front face of the display panel, the side portion covering a side face of the display panel, the rear portion covering the peripheral portion of the rear housing, and the second screw holes being arranged alternately with the first screw holes; and a back face plate covering the rear portion of the frame and the rear housing, and including third screw holes corresponding to the first screw holes and the second screw holes.

4 Claims, 11 Drawing Sheets

DISPLAY DEVICE

CROSS-REFERENCE TO RELATED APPLICATION

The present application claims priority from Japanese Patent Application No. JP 2011-143141 filed in the Japanese Patent Office on June 28, 2011, the entire content of which is incorporated herein by reference.

BACKGROUND

The present disclosure relates to a display device including a television.

Regarding display devices including televisions, reduction in thickness and reduction in frame width have been pursued. For example, in Japanese Unexamined Patent Application Publication No. 2010-197974, reduction in thickness is facilitated by, with use of a fixture having an L-shape in cross-section, holding the outer periphery side of a display face of a display panel section by one side of the L-shape, and sandwiching the display panel between the other side of the L-shape and a panel chassis section. On the other hand, in Japanese Unexamined Patent Application Publication No. 2009-42537 for example, for the purpose of reducing frame width, a pawl hook is provided on a side face of a front cabinet to hook the front cabinet on the outside of a bezel by using the pawl hook.

SUMMARY

However, since, in Japanese Unexamined Patent Application Publication No. 2010-197974, a space for attaching a fixture on the outer periphery side of the display face of the display panel section is necessary, it is difficult to reduce the frame width. In Japanese Unexamined Patent Application Publication No. 2009-42537, a protrusion portion is provided on the outside of the pawl hook of the front cabinet, and an end portion of a rear cabinet having a tray-shape is inserted into a gap between the pawl hook and the protrusion portion. However, since the depth of the rear cabinet is great, there is a limit on reduction in thickness. Under this circumstance, although reduction in thickness and reduction in frame width have been realized separately, it has been quite difficult to realize reduction in thickness and reduction in frame width at the same time.

It is desirable to provide a display device capable of achieving both of reduction in thickness and reduction in frame width.

A display device of an embodiment of the present disclosure includes a display panel; a rear housing covering a back face of the display panel, and including a plurality of first screw holes at a peripheral portion thereof; a frame including a front portion, a side portion, a rear portion, and a plurality of second screw holes provided in the rear portion, the front portion covering a peripheral portion of a front face of the display panel, the side portion covering a side face of the display panel, the rear portion covering the peripheral portion of the rear housing, and the second screw holes being arranged alternately with the first screw holes; and a back face plate covering the rear portion of the frame and the rear housing, and including third screw holes corresponding to the first screw holes and the second screw holes.

In the display device of the embodiment of the present disclosure, the first screw holes are provided in the peripheral portion of the rear housing, while the second screw holes are provided in the rear portion of the frame. The first screw holes and the second screw holes are alternately disposed as seen from the back side of the display panel. Accordingly, both of the rear housing and the frame may be directly fixed to the back face plate without interposing an additional component, and hence reduction in thickness may be realized. In addition, since the peripheral portion on the front face side of the display panel is covered only by the front portion of the frame, an ornamental member or the like configured to cover the front portion of the frame is unnecessary. In this way, reduction in thickness and reduction in frame width are realized.

According to the display device of the embodiment of the present disclosure, the first screw holes of the peripheral portion of the rear housing and the second screw holes of the rear portion of the frame are alternately disposed, and the back face plate is provided with the third screw hole corresponding to the first screw hole and second screw hole so as to fix the rear housing and the rear portion of the frame to the back face plate. Hence, it is possible to realize reduction in thickness and reduction in frame width at the same time.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the present disclosure is specifically described referring to the drawings.

Figure 1:
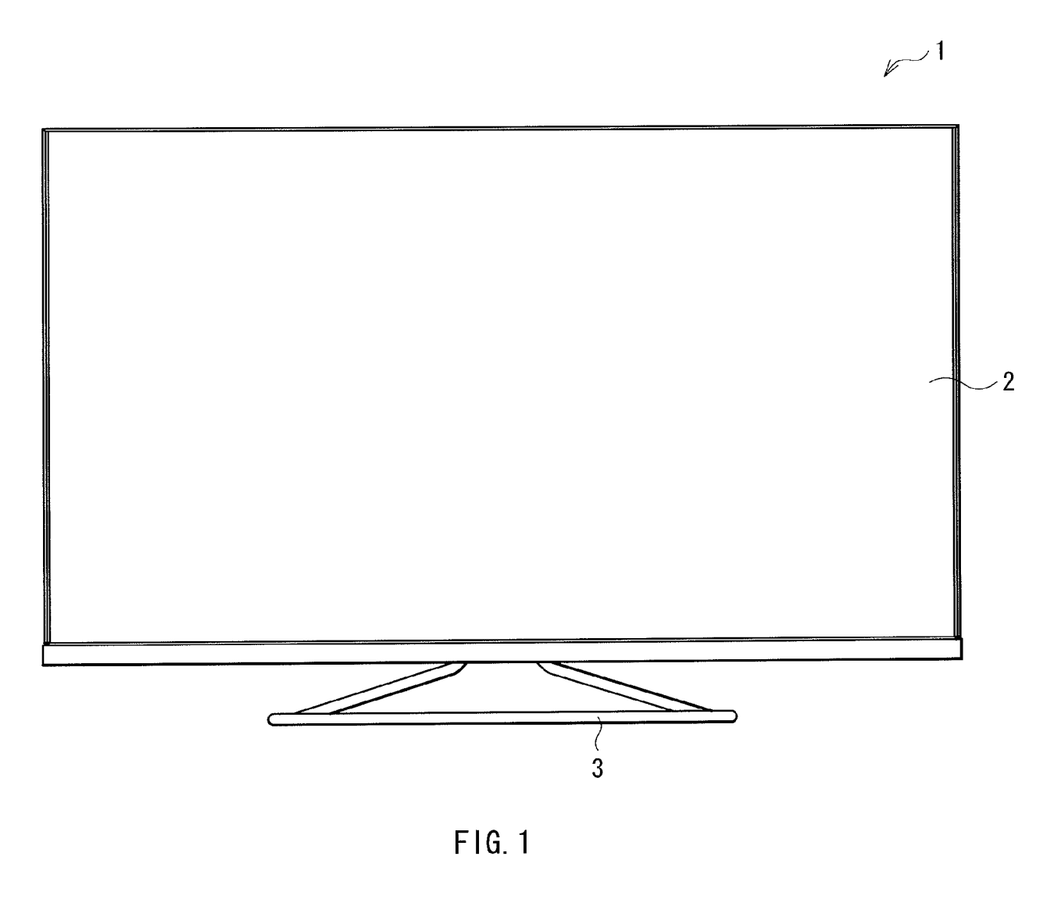
FIG. 1 is a front elevational view showing an external appearance of a display device according to an embodiment of the present disclosure.

FIG. 1 shows an external appearance of a display device 1 according to an embodiment of the present disclosure. The display device 1 is used, for example, as a thin television, and configured to have a plate-shaped main body section 2 for image display supported by a stand 3. The main body section 2 is configured of, for example, a liquid crystal display panel. The stand 3 has, for example, a configuration in which a round bar made of metal such as stainless steel is bent to have an inverted T-shape. It is to be noted that, although the display device 1 is used as a stationary-type display device which is placed on a horizontal plane such as a floor, a shelf, and a stand in a state where the stand 3 is attached to the main body section 2, the display device 1 may also be used as a wall-hanging type display device in a state where the stand 3 is dismounted from the main body section 2.

Figure 2:
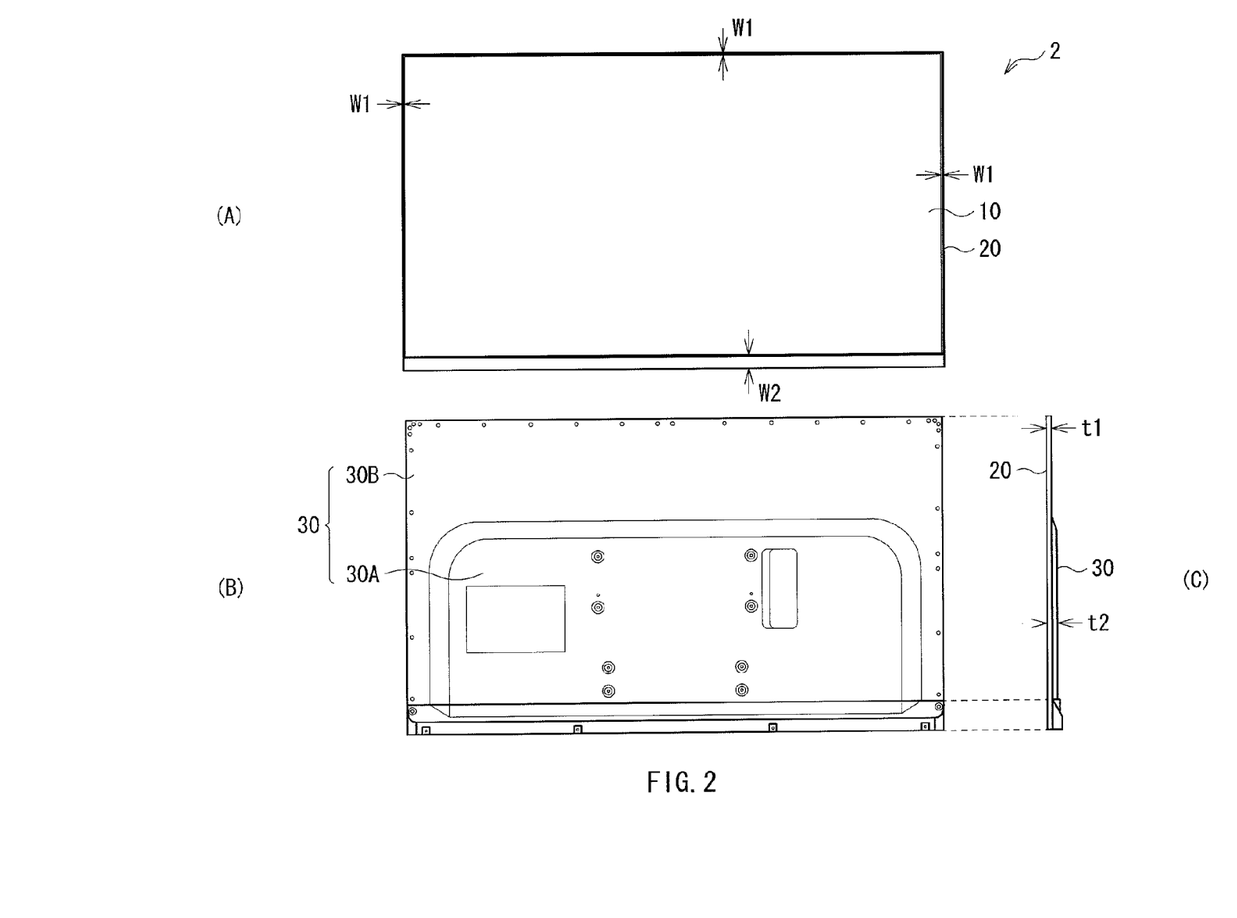
FIG. 2 is a front elevational view, a rear elevational view, and a side elevational view each showing a configuration of a main body section illustrated in FIG. 1.

FIG. 2 shows a configuration of the main body section 2 illustrated in FIG. 1. As illustrated in (A) of FIG. 2, on the front side of the main body section 2, a display panel 10 including a liquid crystal cell 11 described later is disposed on a front face thereof. A peripheral portion of the front face of the display panel 10 is a frame region covered by a frame 20. The frame region of the upper side and the left and right sides is has a width w1, and the width w1 is 4.9 mm, for example. The frame region of the lower side is provided with an optical structure including a light source such as an LED (Light Emitting Diode), an indicator, various kinds of sensors, and the like, and a width w2 thereof is, for example, 26.7 mm.

As illustrated in (B) of FIG. 2, a back face of the main body section 2 is covered by a rear cover (back face plate) 30. A raised section 30A is provided at the center of a lower part of the rear cover 30, and a power source substrate and a signal substrate (both not shown) are provided in the raised section 30A. The region of the upper side and the left and right sides of the rear cover 30, that is, the region other than the raised section 30A, is a plane section 30B having a flat shape. As seen from a side of the main body section 2, as illustrated in (C) of FIG. 2, a thickness (the thickness of the thinnest section) t1 of the plane section 30B is, for example, 8.9 mm, and a thickness (the thickness of the thickest section) t2 of the raised section 30A is, for example, 22 mm.

As described, the display device 1 realizes both of reduction in thickness and reduction in frame width such that the minimum width w1 of the frame region of the main body section 2 is 4.9 mm, and the thickness t1 of the thinnest section is 8.9 mm. A detailed configuration thereof is described below.

Figure 3:
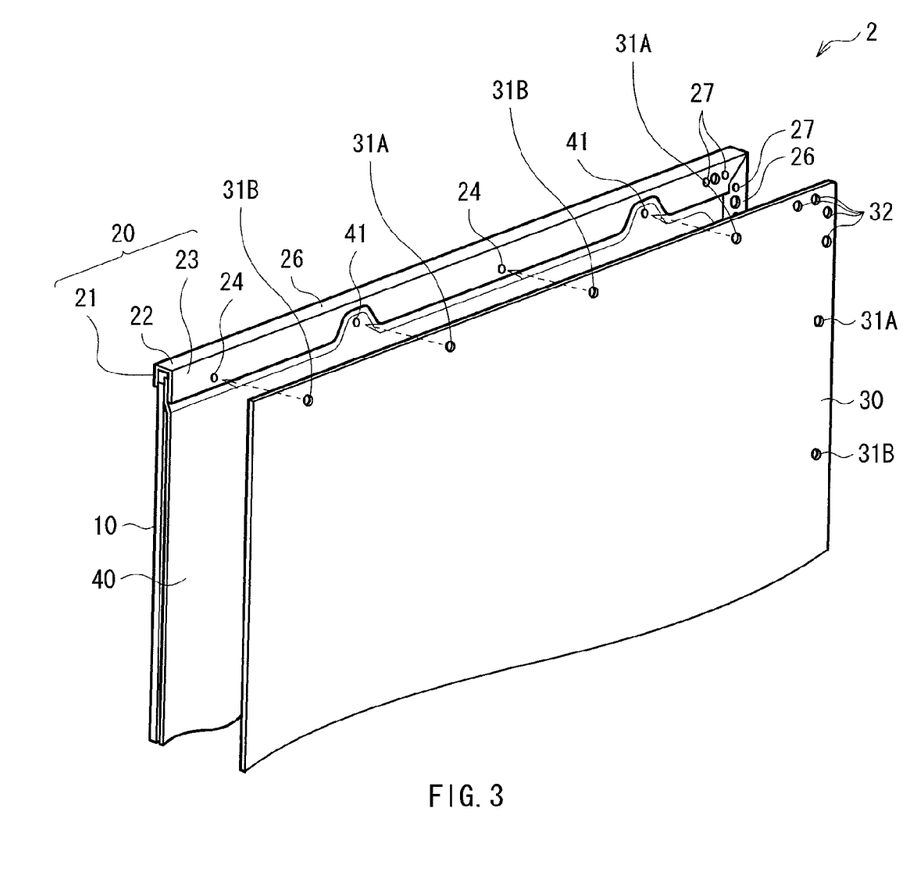
FIG. 3 is an exploded perspective view showing a part of a back face of the main body section illustrated in FIG. 2 in a state where a rear cover is dismounted.

FIG. 3 shows a part of the back face of the main body section 2 illustrated in FIG. 2 in a state where the rear cover 30 is dismounted. The main body section 2 includes, for example, the above-mentioned display panel 10, a back chassis (rear housing) 40, the above-mentioned frame 20, and the above-mentioned rear cover 30.

The back chassis 40 is a member which has a substantially plate shape and covers a back face of the display panel 10. For example, the thickness of the back chassis 40 is 1 mm, and configured of a metal plate made of aluminum (Al) or the like.

The frame 20 is configured of, for example, a metal plate, and configured to have a cross-sectional form of a rectangular with three sides configured of a front portion 21, a side portion 22, and a rear portion 23. As illustrated in (A) of FIG. 2, the front portion 21 is a portion which covers the peripheral portion of the front face of the display panel 10 so as to configure the frame region, and has a thickness of 0.8 mm, for example. The side portion 22 is a portion which covers a side face of the display panel 10, and connects the front portion 21 and the rear portion 23, and has a thickness of 0.8 mm, for example. The rear portion 23 is a portion which covers a peripheral portion of the back chassis 40, and at which fastening to the rear cover 30 is performed as describe later, and a thickness thereof is 1.0 mm, for example.

For example, the rear cover 30 has a thickness of 0.8 mm, and is configured of a plate-shaped member made of metal such as iron (Fe). Since the rear cover 30 is not configured to have a known tray-shape having depth but is configured of a flat plate, reduction in thickness of the main body section 2 may be further promoted. The rear cover 30 is fixed to the rear portion 23 of the frame 20 and the back chassis 40 so as to cover the rear portion 23 and the back chassis 40.

A plurality of first screw holes 41 is disposed in the peripheral portion of the back chassis 40 with intervals therebetween. On the other hand, a plurality of second screw holes 24 is provided in the rear portion 23 of the frame 20. The first screw holes 41 and the second screw holes 24 are alternately disposed as seen from the back side (the rear cover 30 side) of the display panel 10. The rear cover 30 is provided with third screw holes 31A and 31B corresponding to the first screw holes 41 and the second screw holes 24, respectively. With this, the display device 1 realizes both of reduction in thickness and reduction in frame width.

Specifically, since the first screw holes 41 and the second screw holes 24 are alternately disposed, both of the back chassis 40 and the frame 20 may be directly fixed to the rear cover 30 without interposing an additional component, and reduction in thickness may be realized. In addition, since the peripheral portion of the front face of the display panel 10 is covered only by the front portion 21 of the frame 20, the front portion 21 need not be additionally covered by an ornamental member. In this way, reduction in thickness and reduction in frame width are realized.

Figure 4:
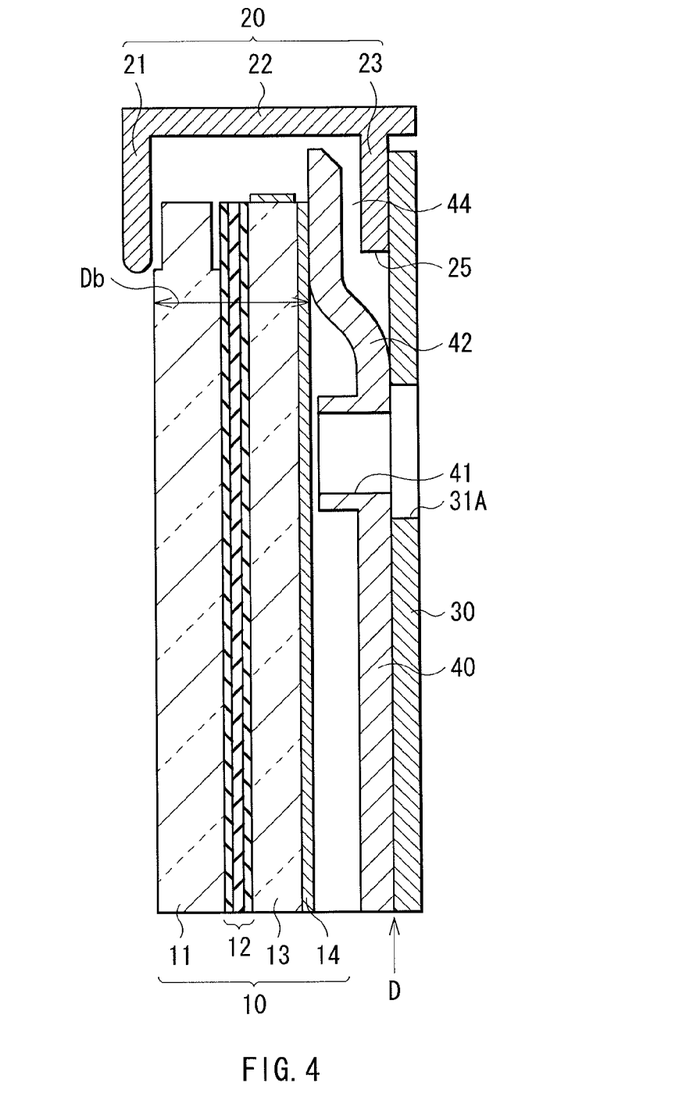
FIG. 4 is a sectional view along a first screw hole of a back chassis illustrated in FIG. 3 and a third screw hole of a rear cover corresponding to the first screw hole.
Figure 5:
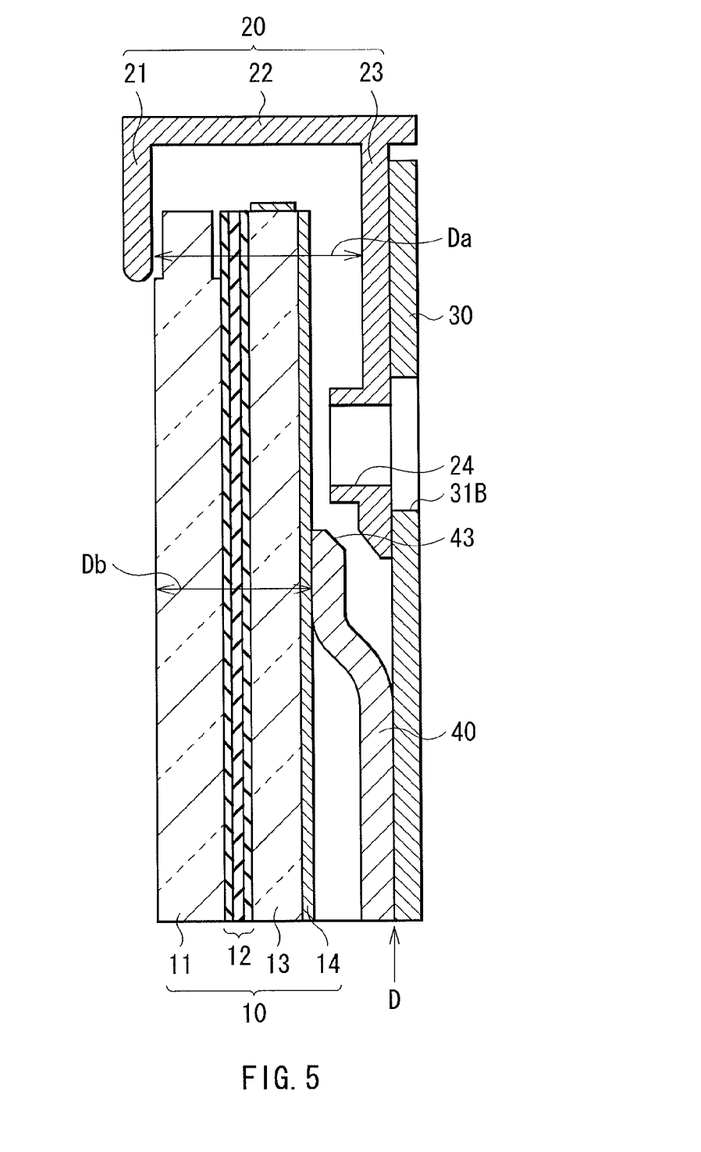
FIG. 5 is a sectional view along a second screw hole provided in a rear portion of a frame illustrated in FIG. 3 and the third screw hole of the rear cover corresponding to the second screw hole.
Figure 6:
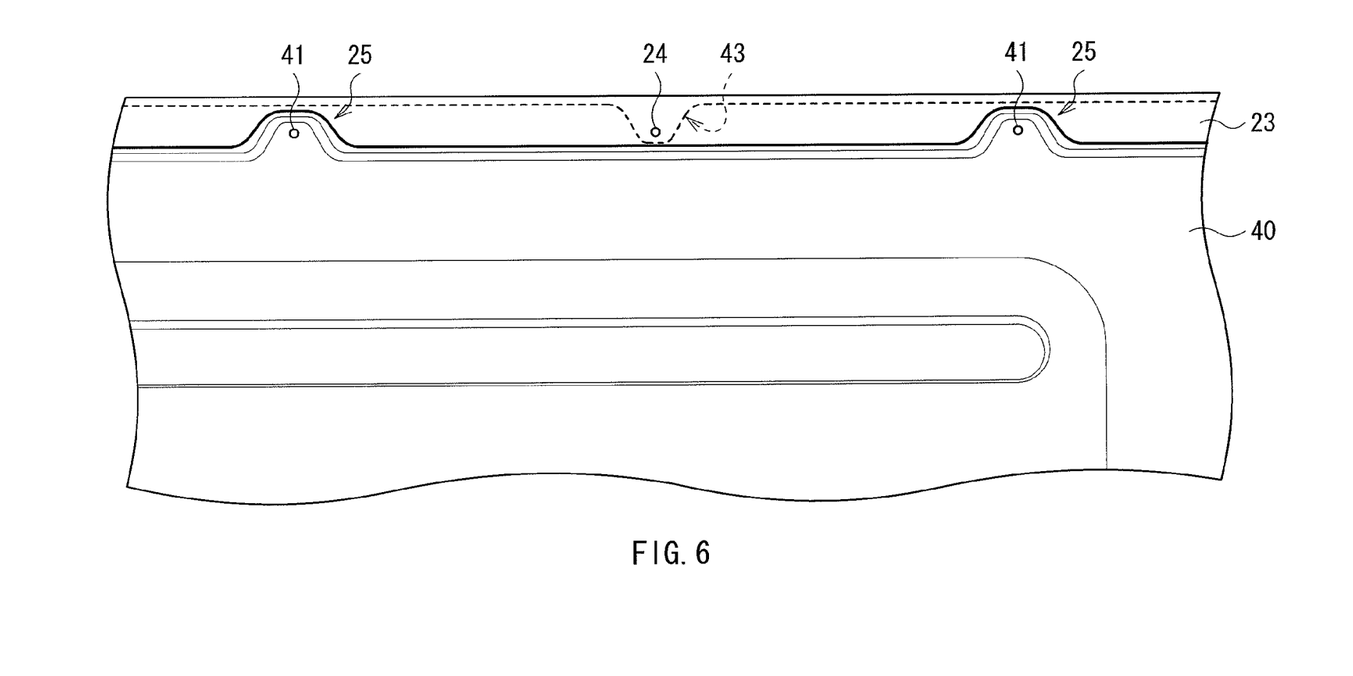
FIG. 6 is an enlarged plan view showing a part of the back chassis and the frame illustrated in FIG. 3.

FIG. 4 shows a cross-section along the first screw hole 41 of the back chassis 40 and the third screw hole 31A of the rear cover 30 corresponding to the first screw hole 41. FIG. 5 shows a cross-section along the second screw hole 24 of the rear portion 23 of the frame 20 and the third screw hole 31B of the rear cover 30 corresponding to the second screw hole 24. FIG. 6 shows a part of the back chassis 40 and the frame 20 illustrated in FIG. 3 in an enlarged manner.

As illustrated in FIG. 4 and FIG. 5, the display panel 10 includes, for example, in order from the front face side, a cell 11 including a liquid crystal layer (not shown), an optical sheet 12 such as a diffusion plate, a light guide plate 13, and a reflective plate 14.

As illustrated in FIG. 4 and FIG. 6, the first screw hole 41 is provided in a raised section 42 of the back chassis 40, and a cutout portion 25 circumventing the raised section 42 is provided at the rear portion 23 of the frame 20. With this, the first screw holes 41 directly contact the internal surface of the rear cover 30, making it possible to screw-fix the back chassis 40 and the rear cover 30 with use of the first screw holes 41 and the third screw holes 31A.

In addition, as illustrated in FIG. 5 and FIG. 6, the back chassis 40 is provided with a cutout portion 43 circumventing the second screw hole 24 at a position of the second screw hole 24 of the rear portion 23 of the frame 20. With this, the second screw holes 24 directly contact the internal surface of the rear cover 30, making it possible to screw-fix the rear portion 23 of the frame 20 and the rear cover 30 with use of the second screw holes 24 and the third screw holes 31B.

As illustrated in FIG. 3 and FIG. 6, it is preferable that the first screw holes 41 and the second screw holes 24 be alternately disposed on the same straight line. With this, workability is enhanced and design property is improved.

Figure 7:
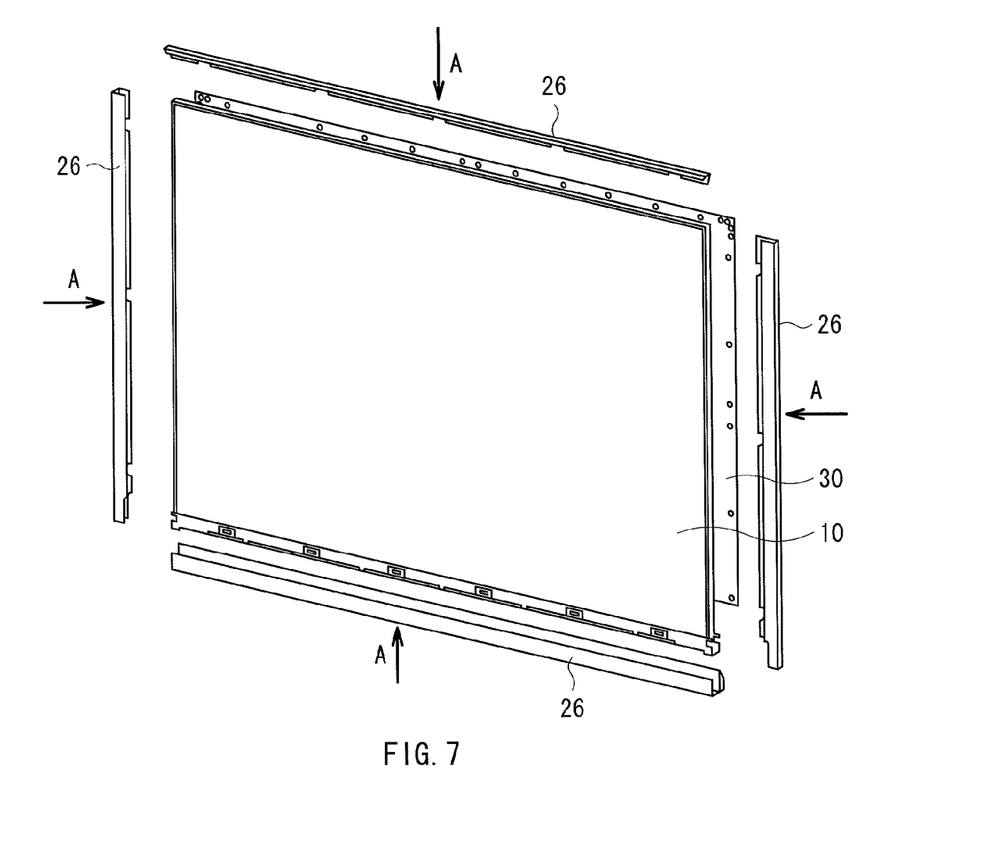
FIG. 7 is an exploded perspective view showing the frame illustrated in (A) of FIG. 2.

FIG. 7 shows the frame 20 illustrated in FIG. 2 to FIG. 6 in an exploded manner. The frame 20 includes a plurality of (four in FIG. 7, for example) divided frames 26. While each of the divided frames 26 is separately provided for each side of the display panel 10 in the case where the outer shape of the display panel 10 is a polygon such as a rectangular, the divided frame 26 may be separately provided for each given portion of a contour line of the display panel 10 in the case where the contour line of the display panel 10 has a curved shape such as a circle or other indeterminate shapes.

As illustrated in FIG. 3 to FIG. 5, each of the divided frames 26 has a cross-sectional form of a rectangular with three sides configured of the front portion 21, the side portion 22, and the rear portion 23. Therefore, as illustrated by an arrow A in FIG. 7, the divided frames 26 are slid from the side face sides of the display panel 10 to cover end portions of the display panel 10 and the back chassis 40. As illustrated in FIG. 4 for example, in order to facilitate the slide mounting of the divided frame 26, it is preferable to provide a clearance (spacing) 44 having a size of, for example, about 0.5 mm between the end portion of the back chassis 40 and an internal face of the rear portion 23 of the frame 20.

As illustrated in FIG. 3, the divided frames 26 of the frame 20 are connected to each other by backing corners, or boundary lines between the divided frames 26, with use of the rear cover 30. For this purpose, the rear portion 23 of the frame 20 is provided with fourth screw holes 27 configured to fix the corners of the frame 20. On the other hand, the rear cover 30 is provided with fifth screw holes 32 corresponding to the fourth screw holes 27. By screw-fixing the frame 20 and the rear cover 30 with use of the fourth screw holes 27 and the fifth screw holes 32, the divided frames 26 may be connected to each other to form a frame form, and thus, high stiffness may be obtained. In addition, since a connecting member or the like for connecting the corners of the frame 20 is unnecessary, reduction in thickness may be facilitated, and a simplified process, reduction in the number of components, and cost reduction may be realized.

As also illustrated in FIG. 3, it is preferable that the first screw holes 41, the second screw holes 24, and the fourth screw holes 27 be disposed in an aligned manner on the same straight line. With this, workability is enhanced and design property is improved.

The display device 1 may be manufactured in the following manner, for example.

First, the cell 11, the optical sheet 12, the light guide plate 13, and the reflective plate 14 are assembled to form the display panel 10. At a lower part of the display panel 10, an optical structure including a light source such as an LED, an indicator, and various kinds of sensors are provided. The display panel 10 is placed on a workbench (not shown) with the front face (display face) side down, and the back chassis 40 is mounted on the back face of the display panel 10. The power source substrate and the signal substrate (both not shown) are provided at predetermined positions of the back chassis 40 to establish a connection with the cell 11.

Next, as illustrated in FIG. 7, the divided frames 26 of the frame 20 are slid as illustrated by the arrow A to cover the four sides of the display panel 10. With this, the peripheral portion of the front face of the display panel 10 is covered by the front portion 21 of the frame 20, the side face of the display panel 10 is covered by the side portion 22 of the frame 20, and the peripheral portion of the back chassis 40 is covered by the rear portion 23 of the frame 20. At this time, as illustrated in FIG. 4, since the clearance 44 of about 0.5 mm, for example, is provided between the end portion of the back chassis 40 and the internal face of the rear portion 23 of the frame 20, the slide mounting of the frame 20 may be easily performed.

Thereafter, as illustrated in FIG. 3 to FIG. 5, the rear cover 30 is mounted on the rear portion 23 of the frame 20 and the back chassis 40, and the back chassis 40 and the rear cover 30 are screw-fixed to each other with use of the first screw holes 41 and the third screw holes 31A while the frame 20 and the rear cover 30 are screw-fixed to each other with use of the second screw holes 24 and the third screw holes 31B.

Here, since the first screw holes 41 and the second screw holes 24 are alternately disposed as illustrated in FIG. 3 and FIG. 6, both of the back chassis 40 and the frame 20 may be directly fixed to the rear cover 30 without interposing an additional component, and reduction in thickness may be realized. In addition, since a screwing work for fixing may be performed on the rear side of the main body section 2, work efficiency is greatly improved. Further, since the peripheral portion of the front face of the display panel 10 is covered only by the front portion 21 of the frame 20, an ornamental member or the like configured to cover the front portion 21 of the frame 20 is unnecessary. With this, reduction in thickness and reduction in frame width may be further promoted.

In addition, since the three components including the back chassis 40, the frame 20, and the rear cover 30 are fixed together, high stiffness may be ensured even if thickness and frame width are reduced. Consequently, the strength of the main body section 2 as a whole is increased, and deformation such as bending becomes less likely to occur. Accordingly, this enables a transportation using thin packaging materials without the necessity to provide a reinforcing plate or the like, while improving transportation efficiency and reducing transportation cost.

Further, as illustrated in FIG. 3 and FIG. 6, since the first screw holes 41 and the second screw holes 24 are alternately disposed on the same straight line, workability is enhanced and design property is improved.

The frame 20, the rear cover 30, and the back chassis 40 are fixed together by taking the internal face of the rear cover 30 as a reference face D (datum). Specifically, as illustrated in FIG. 5, by screw-fixing the frame 20 and the rear cover 30 with use of the second screw holes 24 and the third screw holes 31B, a distance Da between the internal face of the rear cover 30 and the internal face of the front portion 21 of the frame 20 is defined. In addition, as illustrated in FIG. 4, by screw-fixing the back chassis 40 and the rear cover 30 with use of the first screw holes 41 and the third screw holes 31A, a distance Db between the internal face of the back chassis 40 and the external face of the cell 11 becomes equivalent to the thickness of the display panel 10 (that is, the total thickness of the cell 11, the optical sheet 12, the light guide plate 13, and the reflective plate 14). With this, the end portions of the display panel 10 and the back chassis 40 are loosely held in the frame 20, and the cell 11 is not forcibly fixed to other components except that it is in contact with the frame 20 at its lower side by gravity, in a naturally erected state. Accordingly, without the necessity to directly and tightly fix the cell 11 to the frame 20 by screwing or the like, it is possible to eliminate the possibility that the display panel 10 and the back chassis 40 are swung in the frame 20. Hence, a mechanical stress on the cell 11 is reduced, and optical unevenness (so-called white distortion) caused by the mechanical stress on the cell 11 is suppressed.

Further, as illustrated in FIG. 3, the corners of the frame 20 are fixed to the rear cover 30 with use of the fourth screw holes 27 and the fifth screw holes 32. Consequently, the divided frames 26 are connected to each other to form the frame 20 having a frame form, and high stiffness may be obtained.

At this time, as also illustrated in FIG. 3, since the first screw holes 41, the second screw holes 24, and the fourth screw holes 27 are disposed in an aligned manner on the same straight line, workability is enhanced and design property is improved.

In this manner, the main body section 2 illustrated in FIG. 2 is formed. Finally, the stand 3 is mounted on the back face of the main body section 2, and thus the display device 1 illustrated in FIG. 1 is completed.

As described hereinabove, in the present embodiment, the first screw holes 41 provided in the peripheral portion of the back chassis 40 and the second screw holes 24 of the rear portion 23 of the frame 20 are alternately disposed, and the third screw holes 31A and 31B respectively corresponding to the first screw holes 41 and the second screw holes 24 are provided to the rear cover 30 so that the back chassis 40 and the rear portion 23 of the frame are fixed to the rear cover 30. Hence, reduction in thickness and reduction in frame width may be realized at the same time. In addition, since the three components including the back chassis 40, the frame 20, and the rear cover 30 are fixed together, without sacrificing the strength of the main body section 2, frame width and thickness may be reduced while ensuring high stiffness.

APPLICATION EXAMPLE

Next, referring to FIG. 8 to FIG. 12, an application example of the display device 1 is described. The display device 1 is applicable to electronic units in various fields including a television, a digital camera, a notebook personal computer, a portable terminal apparatus such as a mobile phone and a smartphone, and a video camera. In other words, the display device 1 is applicable to electronic units in various fields which display, as an image or a video, an externally inputted video signal or an internally generated video signal.

Application Example 1

Figure 8A:
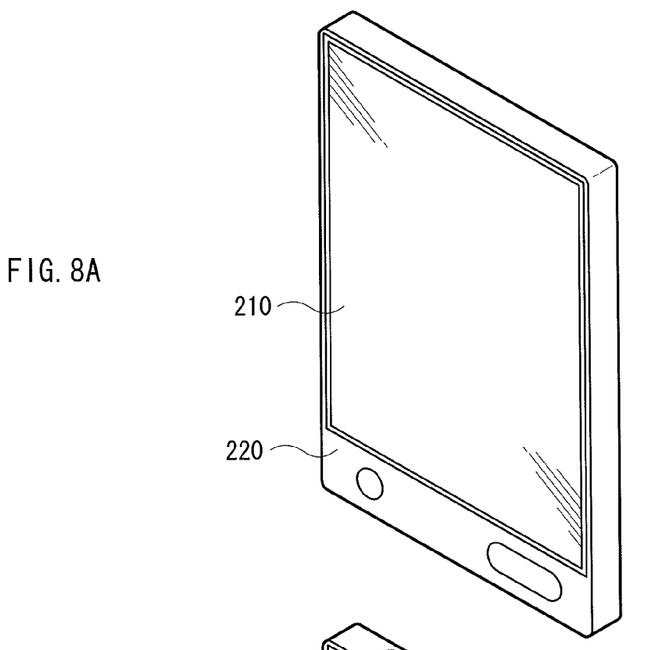
FIGS. 8A and 8B are perspective views showing an external appearance of application example 1 of the display device.
Figure 8B:
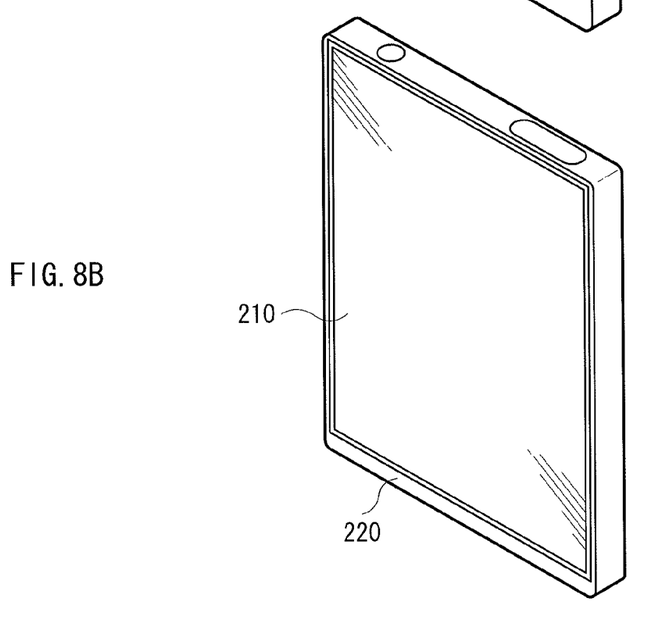

Each of FIGS. 8A and 8B shows an external appearance of an electronic book to which the display device 1 is applied. This electronic book includes, for example, a display section 210 and a non-display section 220. The display section 210 is configured of the display device 1.

Application Example 2

Figure 9:
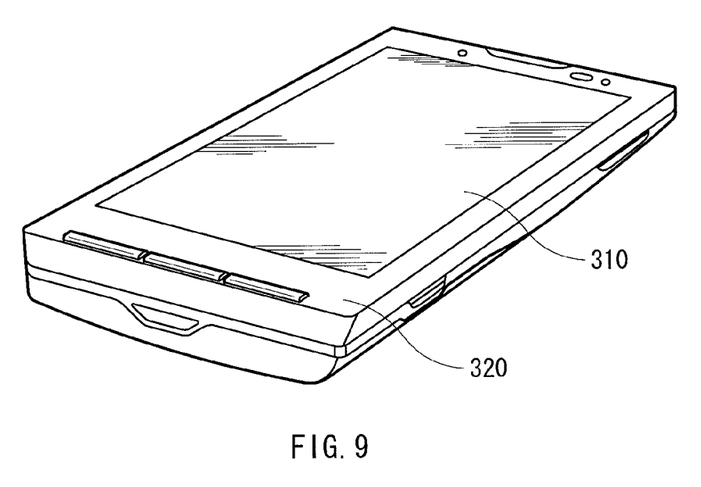
FIG. 9 is a perspective view showing an external appearance of application example 2.

FIG. 9 shows an external appearance of a smartphone to which the display device 1 is applied. This smartphone includes, for example, a display section 310 and a non-display section 320. The display section 310 is configured of the display device 1.

Application Example 3

Figure 10A:
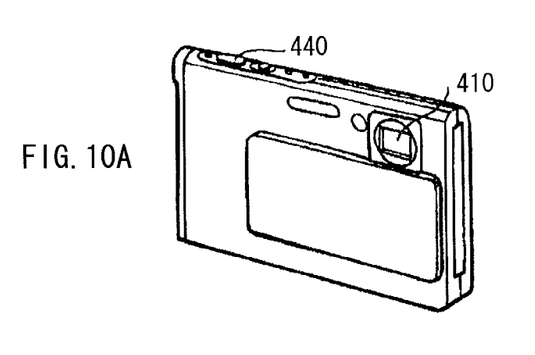
FIG. 10A is a perspective view showing an external appearance of application example 3 as viewed from a front side.
Figure 10B:
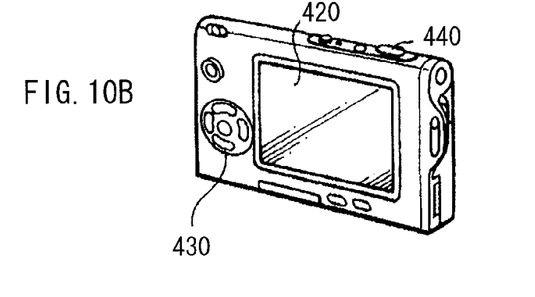
FIG. 10B is a perspective view showing an external appearance of application example 3 as viewed from a rear side.

Each of FIGS. 10A and 10B shows an external appearance of a digital camera to which the display device 1 is applied. This digital camera includes, for example, a light emitting section 410 for generating flash light, a display section 420, a menu switch 430, and a shutter button 440. The display section 420 is configured of the display device 1.

Application Example 4

Figure 11:
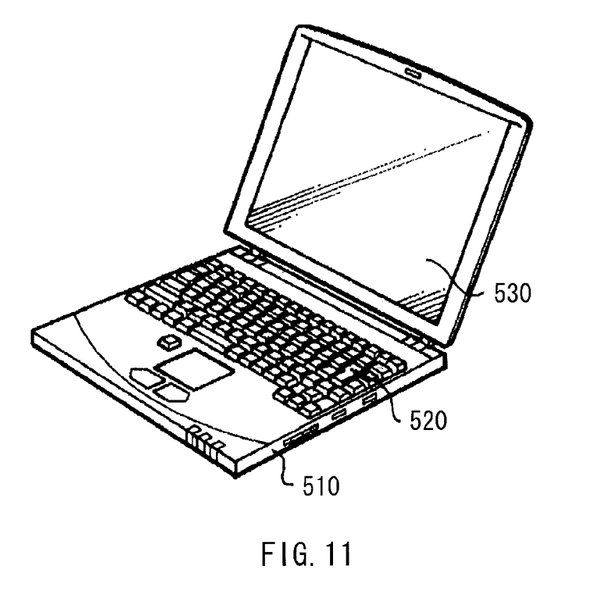
FIG. 11 is a perspective view showing an external appearance of application example 4.

FIG. 11 shows an external appearance of a notebook personal computer to which the display device 1 is applied. This notebook personal computer includes, for example, a main body 510, a keyboard 520 configured to input letters and the like, and a display section 530 configured to display an image. The display section 530 is configured of the display device 1.

Application Example 5

Figure 12:
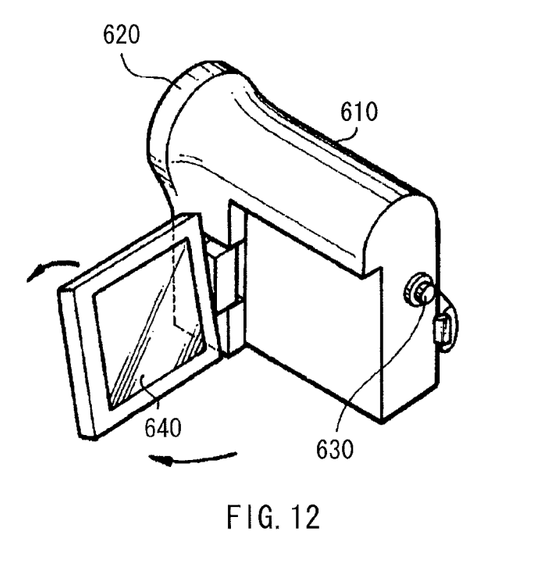
FIG. 12 is a perspective view showing an external appearance of application example 5.
Figures 13A, 13B:
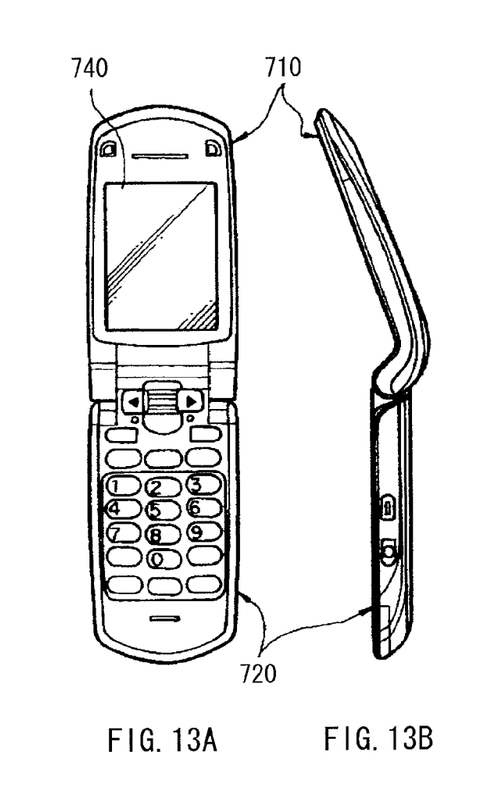
FIG. 13A is a front elevational view of application example 6 in an opened state.
FIG. 13B is a side elevational view thereof.
Figures 13C, 13D, 13E, 13F, 13G:
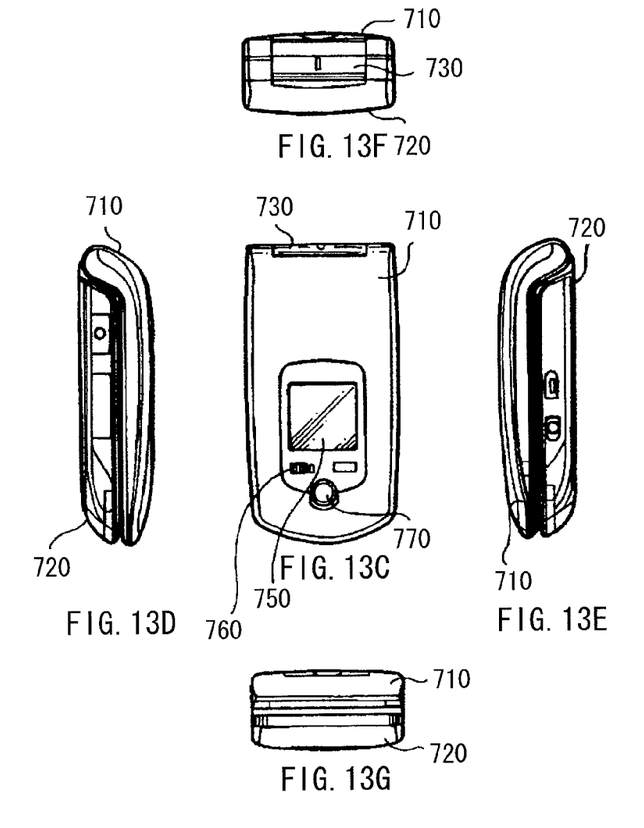
FIG. 13C is a front elevational view in a closed state.
FIG. 13D is a left side view.
FIG. 13E is a right side view.
FIG. 13F is a top view.
FIG. 13G is a bottom view.

FIG. 12 shows an external appearance of a video camera to which the display device 1 is applied. This video camera includes, for example, a main body section 610, a lens 620 which is provided on a front side of the main body section 610 and configured to take an image of a subject, a start/stop switch 630 which is used when capturing an image, and a display section 640. The display section 640 is configured of the display device 1.

Application Example 6

Each of FIGS. 13A to 13G shows an external appearance of a mobile phone to which the display device 1 is applied. This mobile phone includes, for example, an upper housing 710, a lower housing 720, and a connecting section (hinge section) 730 connecting the upper housing 710 and the lower housing 720, a display 740, a sub display 750, a picture light 760, and a camera 770. Among these components, the display 740 or the sub display 750 is configured of the display device 1.

Hereinabove, while the present disclosure is described based on the embodiment, the present disclosure is not limited to the above-mentioned embodiment, and various modifications may be made. For example, in the above-mentioned embodiment, a case is described in which the frame includes a plurality of (four, in FIG. 7) the divided frames 26, and as illustrated in FIG. 3 to FIG. 5, each of the divided frames 26 has a cross-sectional form of a rectangular with three sides configured of the front portion 21, the side portion 22, and the rear portion 23. This configuration of the frame 20 is applicable not only to the case where the first screw holes 41 of the back chassis 40 and the second screw holes 24 of the rear portion 23 of the frame 20 are alternately disposed, and the rear cover 30 is provided with the third screw holes 31A and 31B corresponding to the first screw holes 41 and the second screw holes 24 as in the above-mentioned embodiment, but also to the case where each of the rear cover 30 and the back chassis 40 has a configuration different from that of the above-mentioned embodiment.

In addition, for example, the material and the thickness of each layer are not limited to those described in the above-mentioned embodiment, and other materials and thicknesses may be adopted.

Further, for example, while the configuration of the display device (television) is specifically described in the above-mentioned embodiment, all of the configuration elements are not necessarily included, and other configuration elements may be further included.

Note that the present technology may be configured as follows.

(1) A display device including:
a display panel;
a rear housing covering a back face of the display panel, and including a plurality of first screw holes at a peripheral portion thereof;
a frame including a front portion, a side portion, a rear portion, and a plurality of second screw holes provided in the rear portion, the front portion covering a peripheral portion of a front face of the display panel, the side portion covering a side face of the display panel, the rear portion covering the peripheral portion of the rear housing, and the second screw holes being arranged alternately with the first screw holes; and a back face plate covering the rear portion of the frame and the rear housing, and including third screw holes corresponding to the first screw holes and the second screw holes.

(2) The display device according to (1), wherein the frame includes a plurality of divided frames; and each of the divided frames has a cross-sectional form of a rectangular with three sides configured of the front portion, the side portion, and the rear portion.

(3) The display device according to (2), wherein a clearance is provided between an end portion of the rear housing and an internal face of the rear portion of the frame.

(4) The display device according to any one of (1) to (3), wherein the rear housing includes a raised portion and a cutout portion, the raised portion being provided with the first screw hole, and the cutout portion being provided at a position corresponding to a position of the second screw hole of the rear portion of the frame, and the rear portion of the frame includes a cutout portion at a position corresponding to a position of the raised portion of the rear housing.

(5) The display device according to any one of (1) to (4), wherein the first screw holes and the second screw holes are alternately disposed on the same straight line.

It should be understood by those skilled in the art that various modifications, combinations, sub-combinations, and alterations may occur depending on design requirements and other factors insofar as they are within the scope of the appended claims or the equivalents thereof.

What is claimed is:

1. A display device comprising: a display panel; a rear housing covering a back face of the display panel, and comprising a plurality of first screw holes at a peripheral portion thereof; a frame comprising a front portion, a side portion, a rear portion, and a plurality of second screw holes provided in the rear portion, the front portion covering a peripheral portion of a front face of the display panel, the side portion covering a side face of the display panel, the rear portion covering the peripheral portion of the rear housing, and the plurality of second screw holes being arranged alternately with the plurality of first screw holes; and a back face plate directly covering both of the rear portion of the frame and the rear housing, and comprising a plurality of third screw holes corresponding to the plurality of first screw holes and the plurality of second screw holes; wherein the rear housing comprises a raised portion and a first cutout portion, the raised portion being provided with the plurality of first screw holes, and the first cutout portion being provided at a position corresponding to a position of the plurality of second screw holes of the rear portion of the frame, and the rear portion of the frame comprises a second cutout portion at a position corresponding to a position of the raised portion of the rear housing.

2. The display device according to claim 1, wherein
the frame comprises a plurality of divided frames; and
each of the plurality of divided frames has a cross-sectional form of a rectangular with three sides configured of a front portion, a side portion, and a rear portion.

3. The display device according to claim 1, wherein
a clearance is provided between an end portion of the rear housing and an internal face of the rear portion of the frame.

4. The display device according to claim 1, wherein
the plurality of first screw holes and the plurality of second screw holes are alternately disposed on a same straight line.

* * * * *